United States Patent

[11] 3,599,796

[72] Inventor John Elliott Wilhelm
  Maumee, Ohio
[21] Appl. No. 831,147
[22] Filed June 6, 1969
[45] Patented Aug. 17, 1971
[73] Assignee Johns-Manville Corporation
  New York, N.Y.

[54] FILTER CONSTRUCTION
  10 Claims, 4 Drawing Figs.
[52] U.S. Cl. .................................................. 210/457,
  210/491
[51] Int. Cl. .......................................................... B01d 29/26
[50] Field of Search ........................................... 210/457,
  491, 498

[56] References Cited
UNITED STATES PATENTS
3,177,945 4/1965 Fether ......................... 210/498 X
3,442,391 5/1969 Bozek ........................... 210/457

Primary Examiner—J. L. DeCesare
Attorneys—John A. McKinney and Robert M. Krone

ABSTRACT: A composite filter construction adapted for filtering flow directed from the interior of the filter body outwardly therethrough towards the exterior thereof, comprising an outer section of filtering fluid permeable mass surrounding an inner section also of filtering fluid permeable mass with said inner section having an internal fluid distributing channel therein and a multiplicity of openings passing through its mass extending and increasing in area from the internal fluid distributing channel to the surrounding outer filtering section for secondary fluid distribution.

PATENTED AUG 17 1971 3,599,796

INVENTOR.
JOHN ELLIOTT WILHELM
BY John A. McKinney
ATTORNEY

2

FILTER CONSTRUCTION

BACKGROUND OF THE INVENTION

Filtering units which are designed to perform their clarifying function of entrapping and retaining fluid carried contaminants with the filtering flow directed from the interior of the fluid permeable filter medium outwardly through the body of the medium towards its exterior inherently have comparatively brief service life because of the inevitable relatively smaller area of the internal surface available for surface filtration and primary retention of contaminants afforded by the area of the internal surface in relation to the external surface of the filter body. A variety of measures have therefore been proposed to expand the internal surface area available for initial surface filtering to prolong filter service life for "inside to outside flow" filtering units, including the cutting or forming of various shaped interior depressions or cavities to increase the internal initial filtering surface area such as the internal slots of U.S. Pat. No. 3,061,107. This internal cutting or forming, however, entails difficult manufacturing operations, or the necessity of sectionalized filter bodies, and more often than not does not substantially expand the initial filtering surface and in turn the service life of the unit commensurate with the added costs and disadvantages entailed therein.

SUMMARY OF THE INVENTION

This invention consists of a filter construction designed for a filtering flow directed from the interior of the filter body of fluid permeable material outwardly through the body of the filtering medium to its exterior, which has significantly increased contaminant holding capacity and more effective balance between surface and depth filtering effect. The filter construction comprises a composite filtering body of fluid permeable material including an outer section of continuous fluid permeable filtering mass effectively surrounding an inner section of fluid permeable filtering mass with an internal fluid distributing channel therein and provided with a multiplicity of openings passing through the mass of the said inner section from the interior fluid distributing channel to the surrounding outer section for secondary fluid distribution. The openings passing through the inner section of the filtering fluid permeable mass to effect secondary fluid distribution are formed with a configuration of a minimum area at the interior surface of the inner section making contact with the internal fluid distributing channel and expanding in area outwardly therefrom towards their termination at the outer surface of the inner section making contact with the outer section of the surrounding fluid permeable filtering mass.

It is the primary objective of this invention to provide fluid purifying filters designed for filtering operation with the filtering flow directed from the interior of the filter body outwardly therethrough towards their exterior which have increased solids containment holding capacity and thus longer service life with good clarification efficiency attained through improved balance between surface and depth filtering action and expanded contaminant holding capacity, which can be produced without complicated manufacturing procedures or tooling, loss of strength or integrity within the filter body, or need for nonfiltering core units or reinforcing structures therewith.

DESCRIPTION OF THE DRAWINGS

A fuller understanding of the invention will be obtained from the following detailed description including the drawings in which.

DESCRIPTION OF THE PREFERRED EMBODIMENT

Figure 1:
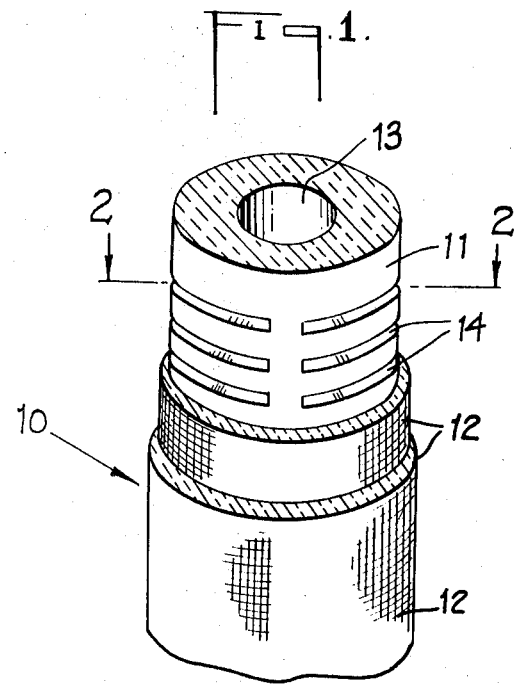
FIG. 1 comprises a perspective view, partly cut away showing the inner section, and multilayer outer section of the preferred filtering construction of this invention.

With reference to FIG. 1 of the drawings, the filter construction of this invention essentially comprises a composite filter body 10, including an inner section 11 composed of fluid permeable material and providing a corelike component, combined with an outer section or sections 12 of fluid permeable material surrounding the inner section. In the preferred embodiment of this invention, the inner section 11 is formed in the most practical and common filter configuration, both as to manufacture and use, of a hollow cylinder having an internal flow channel 13 extending axially therethrough for the introduction and primary distribution of the fluid to be filtered internally within the body of the fluid permeable filtering medium. Inner section 11 is provided with secondary fluid distributing means comprising a multiplicity of openings 14 passing through this section providing direct fluid communication from the internal flow channel 13 to the surrounding outer section 12 of the composite filter body. To expand the solids containment holding capacity of the filter while maintaining a high level of purification through a better balance between surface and depth filtration, the openings 14 are of relatively limited area at the location of the internal surface of inner section 11 wherein they make limited contact through a small orifice 15 with the internal flow channel 13 and therefrom expand in area outwardly towards the outer surface of inner section 11 which is in contact with the outer filter section 12.

Figure 2:
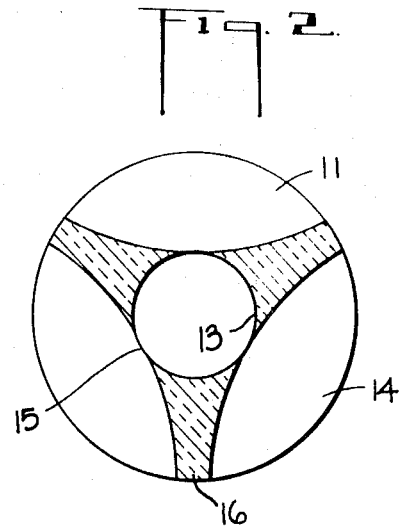
FIG. 2 is a sectional view of the inner section of FIG. 1, taken along lines 2—2, showing the internal configuration of the secondary fluid distributing means of the inner section.

In the preferred embodiment of this invention, both for reasons of simplified manufacture or tooling and for maximum product strength, the openings 14 are formed by circular saw or rabbeting cutting means since these means conveniently provide openings through the inner section of the designed outwardly expanding area as well as comprising commonly available cutting tools which may be mounted in multiples on a common shaft to enable simultaneously effecting a plurality of cuts forming the appropriate openings in one operation. Circular cutout openings, as clearly shown in the sectional view of FIG. 2, provide a concavity the depth of which is semicircular or arcuate in shape whereby regardless of whether or not the sidewalls of the cuts are parallel as would be typically formed by such cutting means, or are flared, the area of circular cut openings expands in a direction outwardly as a result of the semicircular varying depth, or conversely stated, converges in area inwardly. To achieve the necessary but limited passage communicating with the internal distributing channel 13, the openings are cut to penetrate to the extent of the converging area of the depth of the concavity or its apex, regardless of precise configuration, extending just through the internal surface of inner section 11 providing an orifice shown as 15 at the converging area of its maximum depth or apex.

The cutouts from the openings 14 may be formed in any pattern on the inner section as well as number thereof and size, for example in staggered relationship and in differing widths, but for manufacturing expediency it is preferred to form the cuts aligned in columns as shown in the illustration of FIG. 1 and 2. The number of columns can be varied with 2, 3, or 4 being usual, and depending in part upon the wall thickness of the inner section 11 and the radius of the cut, since to maintain ample strength and integrity of the inner section 11 component of the filter a limited portion of the outer surface such as 16 should be preserved intermediate the openings.

Figure 3:
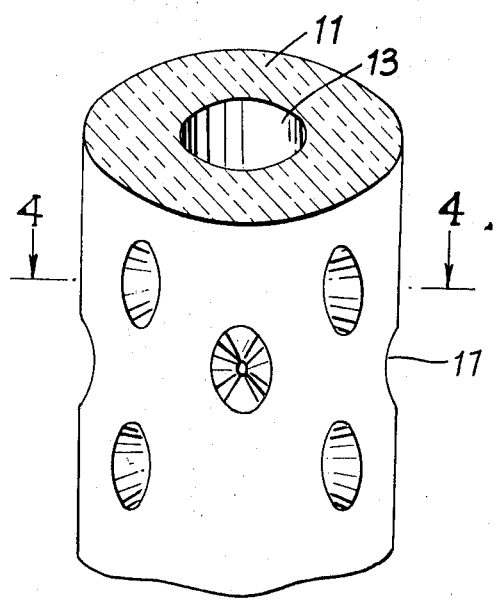
FIG. 3 is a perspective view of an alternate construction for the openings of the inner section; and, FIG. 4 is a sectional view of the alternate construction of the inner section of FIG. 3 showing the internal configuration of the modified secondary fluid distributing means taken along lines 4—4 of FIG. 3.
Figure 4:
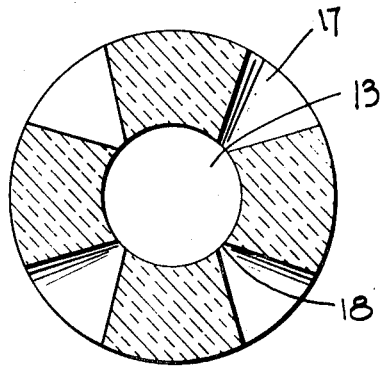

Other cutting means producing openings of differing configuration, but of expanding area outwardly in keeping with the precepts of the invention, may be utilized comprising for example conical or stepped drills or routers, and similar cutting instruments which in general form concavities tending to converge to an apex. Such means can readily be applied to the outer surface of inner section 11 to produce openings of comparable function. Also, the openings of the essential shape of this invention can be formed by molding if the material of the filter is amenable to molding formation. Thus, the inner section of the composite filter of this invention could be constructed of a hollow cylinder having a plurality of random or staggered distributed conical shaped holes with their inwardly directed apex culminating just through the inner surface of the section and meeting in fluid contact with the internal distributing channel as illustrated in FIGS. 3 and 4. In this alternate embodiment of the invention, a multiplicity of conical shaped openings 17 are drilled into and just through inner section 11 whereby they penetrate the interior surface of internal flow channel 13 to provide a small orifice 18 in communication with internal distributing channel 13.

The outer section 12 of fluid permeable material of the composite filter body 10 of this invention may be composed substantially of any conventional filtering construction or medium which can be applied to effectively surround or be superimposed over the exterior surface of the inner section 11 having therein the openings 14 or 17 in a manner which inhibits fluid bypass or channeling to the extent of detracting from filtering efficiency. This component of the filter may constitute either a single or multiplicity of layers, as shown in FIG. 1, of appropriate filtering material.

Preferred compositions for the fluid permeable filtering medium of both the inner and outer sections 11 and 12 of the composite filtering body of this invention comprise resin bonded glass fibers, a currently common and widely used material as a filtering medium in a variety of filtering applications. Filters, or components therefor, of resin bonded glass fibers are most commonly and conveniently constructed of thin webs or mats of glass fibers having bonding resin throughout with the fibers either generally arranged substantially parallel to each other or randomly intermeshed. Such webs or mats are convolutely wound as on a forming mandrel about themselves producing a tubularlike configuration and the resin binder content thereof is cured to fix their distribution and impart strength and integrity to the unit. The degree of fluid permeability or pore size best suited for a particular filtering application can easily be governed by fiber diameter, or orientation, or the assembled density achieved in forming, or by means of a combination of such conditions. Moreover, the degree of fluid permeability or pore size of the overall filter or filtering mass thereof can be easily graduated or varied through the filter body transverse to the direction of the filtering flow with glass fiber filtering media by changing densities, fiber diameter, etc.

Also, glass fibers, in addition to their highly effective mechanical filtering action of physically entrapping and retaining fluid carried solid contaminants either adjacent to the initial filtering surface of the body or interior thereof within their circuitous interstices, are also effective to coalesce liquid contaminants contained within the fluid being filtered, as for example the coalescence of water in jet fuel wherein the very fine bodies of emulsified water within the organic medium are collected and joined together into larger drops apparently by the affinity of water for the glass fiber and thus trapped and retained within the pores of the glass fiber body.

Glass fibers are additionally preferred due to their availability in highly uniform diameters, their relative inert nature, good chemical resistance, freedom from rot, deterioration etc. as well as their unique affinity in some applications as mentioned hereinbefore. Nevertheless, the principle of the unique filter construction of this invention as a means of achieving an improved balance between surface and depth filtration and thereby attaining increased solids containment holding capacity providing longer service life is equally applicable to filters composed of other conventional filtering materials such as organic fibers, bonded particulate filter material, etc., alone or in combination with glass fibers.

A specific embodiment comprising a fuel filter constructed pursuant to the concept of this invention and its filtering characteristics and efficiencies is as follows. The inner section or core of this embodiment is composed of a typical glass fiber tube filter unit made up of fibers of a diameter range of about 0.00015 to 0.00018 and containing throughout approximately 18 percent phenol formaldehyde resin binder consolidated to a density of 11 lbs. per cubic foot. The cylindrical tube is constructed with an outside diameter of 3 inches and an internal fluid distribution channel axially therethrough of an inside diameter of 1-⅝ inches, leaving a tube wall thickness of approximately eleven-sixteenths of an inch. The inner section was cut with three columns of grooves, spaced approximately 120° apart around the periphery thereof with one-half inch on center spacing between the grooves axially along the tube. The grooves were cut with 12 inch diameter blades and penetrated to the inside surface of the internal fluid distributing passage to form a direct fluid passage from the internal fluid distributing passage. This cylindrical tube inner section was wrapped in a plurality of phenol formaldehyde resin containing glass fiber mats and polyvinyl chloride coated glass fiber screens convolutely about its peripheral surface including the following in the given order: a one-fourth inch thick mat of 1 lb. per cubic foot density when cured containing fibers of 0.00011 to 0.00013 inch diameter; and an overlay of a polyvinyl chloride coated glass fiber screen of 14×18 mesh; a second mat one-half inch thick and of 6 lb. per cubic foot density of fine fibers of 0.00003 to 0.00005 inches diameter. The polyvinyl chloride coated glass fiber screen is heat sealed in position and the composite including the surrounding formed laminates increases the outside diameter to approximately 3.4 inches. The body is thereafter wrapped with a one-half inch thick 6 lbs. per cubic foot density glass fiber mat composed of fibers, the diameter ranging from about 0.0031 to 0.0035 containing 10 percent of phenol formaldehyde binder and a second polyvinyl chloride coated fiber glass screen of 14×18 mesh which is in turn heat sealed and the approximate outside diameter of the composite is then about 3.7 inches. Both ends of this tubular construction are sealed with appropriate means, and when tested pursuant to military specification MIL-F-8901A, this product exhibited the following characteristics given along with the standards of military test for comparison. The test data for the various conditions in the military standard are as follows:

TEST REQUIREMENTS AND AVERAGE RESULTS

|  | MIL-F-8901A | Example |
|---|---|---|
| 1. Pressure drop calibration, 125% rated flow | 5 p.s.i., max | 3.5 p.s.i., avg. |
| 2. Separation (water removal efficiency) contamination: | | |
| .5% water* | 3.0 p.p.m. max | 0.0 p.p.m. |
| .01% water* | do | Do. |
| 10% water* | do | .55 p.p.m. max. |
| 3. Red iron oxide slurry: | | |
| a. Holding capacity to a 40 p.s.i. pressure drop limit | | |
| Per MIL spec procedure | 200 g.m./element | 221 gm./element. |
| Per independent test | do | 306 gm./element. |
| b. Solids efficiency—solids in effluent fuel | .5 mg./liter avg | All below spec. |
| c. Water removal efficiency— p.p.m. in eff. fuel | 3.0 p.p.m. max | .55 p.p.m. max. |
| 4. Red iron oxide dry: | | |
| a. Holding capacity to 40 p.s.i. pressure drop limit | 200 gm./element | 457 gm./element. |
| b. Solids efficiency—in effluent fuel to 75 p.s.i. | .5 mg./liter avg | All below spec. |
| 5. Inhibited fuel plus water and AC dust: | | |
| a. Max. pressure drop when loaded with 400 gm. AC dust | 40 p.s.i. | 20 p.s.i. |
| b. Solids efficiency—solids in effluent fuel | .5 mg./liter avg | All below spec. |
| c. Water removal efficiency— p.p.m. in effluent fuel | 3.0 p.p.m. max | 15. p.p.m. max. |

*Parts per million in effluent fuel.

What I claim is:

1. A filter construction with a composite filter body, comprising: an inner section of fluid permeable filtering material having an internal distributing flow channel and a multiplicity of openings formed in the outer surface of said inner section and passing through said inner section, said openings being of converging area inwardly towards the internal distributing flow channel and in fluid communication with the said internal distributing flow channel; and, an outer section of fluid permeable filtering material substantially surrounding said inner section.

2. The filter construction of claim 1, wherein said outer section of filtering material substantially surrounding the said inner section comprises a plurality of superimposed concentric layers of fluid permeable filtering material.

3. The filter construction of claim 1, wherein the multiplicity of openings passing through the inner section and in fluid communication with the internal distributing flow channel are of converging area from the outer surface of the inner section directed inwardly towards the internal distributing flow channel with the apex of the diminishing area of the opening culminating approximately at the interior surface of the inner section forming an orifice in communication with the internal distributing flow channel.

4. A filter construction of claim 3, wherein the configuration of the opening of converging area passing through the inner section is conical in shape.

5. A filter construction of claim 3, wherein the openings of converging area passing through the inner section comprise slots having substantially parallel walls penetrating to a varying depth therein which culminate with the apex of maximum depth of the openings in fluid communication with the internal distributing flow channel of the inner section.

6. A filter construction with a composite filtering body comprising: a cylindrical tubelike inner section of fluid permeable material with an internal distributing flow channel extending the axial length of the cylinder tubelike section and having distributed over its outer annular surface a multiplicity of slots extending into its mass to a depth of concave arcuate configuration culminating with the apex of the arcuate slot depth extending just through the interior surface of the said inner section and opening into the internal distributing flow channel; and, an outer section of fluid permeable material surrounding the periphery of the outer annular surface of the inner section.

7. The filter construction of claim 6, wherein the outer section comprises a plurality of superimposed concentric layers of fluid permeable material.

8. The filter construction of claim 6 wherein the fluid permeable material of the composite filtering body comprises resin bonded glass fibers.

9. The filter construction of claim 8, wherein the multiplicity of slots distributed over the outer annular surface of the cylindrical tubelike inner section of fluid permeable material and extending into its mass to a depth of concave arcuate configuration culminating with the apex in the arcuate slot depth extending through the interior surface of said inner section and opening into the internal distributing flow channel are arranged in parallel columns over the outer annular surface of said cylindrical tubelike inner section.

10. The filter construction of claim 8, wherein the multiplicity of slots distributed over the outer annular surface of the cylindrical tubelike inner section of fluid permeable material and extending into its mass to a depth of the concave arcuate configuration culminating with the apex of the arcuate slot depth extending through the interior surface of said inner section and opening into the internal distributing flow channel, are circular saw cuts.